United States Patent
Hand et al.

(10) Patent No.: US 8,281,420 B2
(45) Date of Patent: Oct. 9, 2012

(54) HINGE ASSEMBLY FOR A TOILET SEAT

(75) Inventors: Joseph Hand, Sheboygan Falls, WI (US); John Seaman, Sheboygan Falls, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 434 days.

(21) Appl. No.: 12/366,895

(22) Filed: Feb. 6, 2009

(65) Prior Publication Data
US 2009/0211005 A1    Aug. 27, 2009

Related U.S. Application Data

(60) Provisional application No. 61/066,681, filed on Feb. 22, 2008, provisional application No. 61/109,049, filed on Oct. 28, 2008.

(51) Int. Cl.
 *A47K 13/12* (2006.01)
(52) U.S. Cl. .......... 4/236; 4/240; 16/365; 411/432
(58) Field of Classification Search ............ 4/234–241; 16/365, 386, 387, 367, 382; 411/432
 See application file for complete search history.

(56) References Cited

U.S. PATENT DOCUMENTS

| | | | |
|---|---|---|---|
| 1,221,060 A * | 4/1917 | Judd | 4/237 |
| 1,784,619 A | 12/1930 | Bishop | |
| 1,975,570 A * | 10/1934 | Edgcumbe | 4/236 |
| 2,004,023 A * | 6/1935 | Uffen | 4/240 |
| 2,069,756 A * | 2/1937 | Glancy et al. | 4/240 |
| 2,086,211 A | 7/1937 | Campbell | |
| D120,842 S | 5/1940 | Warth | |
| 2,212,295 A * | 8/1940 | Leslie | 4/236 |
| 2,253,642 A | 8/1941 | Moore | |
| 2,535,789 A | 12/1950 | DeBell | |
| 2,852,786 A * | 9/1958 | Reinhard | 4/236 |
| 2,913,735 A * | 11/1959 | Leslie | 4/234 |
| 3,032,777 A | 5/1962 | Young | |
| 3,046,570 A | 7/1962 | Young | |
| 3,063,063 A * | 11/1962 | Brooks | 4/236 |
| 3,065,035 A | 11/1962 | Biesecker | |
| 3,080,572 A * | 3/1963 | Miller et al. | 4/240 |
| 3,174,385 A * | 3/1965 | Hallowell | 411/2 |

(Continued)

FOREIGN PATENT DOCUMENTS

CH    375861    3/1964

(Continued)

OTHER PUBLICATIONS

PCT/US2009/050836 International Search Report and Written Opinion dated Apr. 19, 2010 (19 pages).

(Continued)

*Primary Examiner* — Robert Canfield
*Assistant Examiner* — Babajide Demuren
(74) *Attorney, Agent, or Firm* — Michael Best & Friedrich LLP

(57) ABSTRACT

A hinge assembly for a toilet seat, the hinge assembly comprising a hinge post for pivotally supporting the toilet seat on a toilet bowl, and a bolt embedded in the hinge post and configured to extend through an opening in the toilet bowl, the bolt having thereon a plurality of projections extending into the hinge post to distribute to the hinge post forces applied to the bolt.

11 Claims, 16 Drawing Sheets

U.S. PATENT DOCUMENTS

| | | | |
|---|---|---|---|
| 3,238,581 A | | 3/1966 | Sawyer |
| 3,254,363 A | * | 6/1966 | Watson ............................ 16/390 |
| 3,311,147 A | * | 3/1967 | Walker ........................... 411/276 |
| 3,339,003 A | * | 8/1967 | Cessna ........................... 264/262 |
| 3,386,771 A | | 6/1968 | Verdier et al. |
| 3,390,906 A | | 7/1968 | Wing |
| 3,444,775 A | | 5/1969 | Hills |
| 3,449,774 A | * | 6/1969 | Wilham ............................. 4/240 |
| 3,561,317 A | | 2/1971 | Rowell |
| 3,570,021 A | * | 3/1971 | Watson ............................. 4/240 |
| 3,742,583 A | | 7/1973 | Devlin et al. |
| 3,749,362 A | | 7/1973 | O'Connor et al. |
| 3,978,761 A | * | 9/1976 | Sosinski ........................... 411/5 |
| 4,029,379 A | | 6/1977 | Kotala et al. |
| 4,079,471 A | | 3/1978 | Corda |
| 4,080,671 A | | 3/1978 | Stahli |
| 4,290,337 A | | 9/1981 | Kuwata et al. |
| 4,292,007 A | | 9/1981 | Wagner |
| 4,319,365 A | | 3/1982 | Bemis et al. |
| 4,326,307 A | * | 4/1982 | Baillie et al. ...................... 4/236 |
| 4,367,567 A | | 1/1983 | Sendoykas |
| 4,416,048 A | * | 11/1983 | Otte ........................... 29/525.04 |
| 4,639,147 A | | 1/1987 | Schwarz |
| 4,659,267 A | | 4/1987 | Uno et al. |
| 4,688,274 A | | 8/1987 | Grimstad |
| 4,717,299 A | | 1/1988 | Underwood |
| 4,729,134 A | | 3/1988 | Hillebrand et al. |
| 4,729,703 A | | 3/1988 | Sato |
| 4,820,096 A | * | 4/1989 | Knight .......................... 411/169 |
| 4,830,557 A | | 5/1989 | Harris et al. |
| 4,862,556 A | * | 9/1989 | Grass ............................... 16/382 |
| 4,878,255 A | | 11/1989 | Grimstad et al. |
| 4,970,731 A | * | 11/1990 | Fait ................................... 4/234 |
| 4,982,476 A | * | 1/1991 | Salice ............................. 16/382 |
| 5,085,550 A | | 2/1992 | Kendrick |
| 5,108,238 A | | 4/1992 | Ewing |
| 5,190,423 A | | 3/1993 | Ewing |
| 5,308,285 A | | 5/1994 | Malen et al. |
| 5,326,206 A | | 7/1994 | Moore |
| 5,457,824 A | * | 10/1995 | Reed ................................ 4/234 |
| 5,584,628 A | | 12/1996 | Bernoni |
| 5,855,042 A | | 1/1999 | Bruckner |
| 5,879,102 A | | 3/1999 | Koliopoulos |
| 5,918,321 A | | 7/1999 | Olle |
| 5,927,917 A | | 7/1999 | Gibbons |
| 5,933,875 A | | 8/1999 | Hulsebus et al. |
| 5,967,724 A | | 10/1999 | Terry |
| 6,012,886 A | | 1/2000 | Tanamura et al. |
| 6,036,422 A | | 3/2000 | Postma et al. |
| 6,070,295 A | | 6/2000 | Hulsebus |
| 6,101,640 A | | 8/2000 | Brewer et al. |
| 6,102,488 A | | 8/2000 | Wilson |
| 6,381,762 B1 | | 5/2002 | Moser |
| 6,592,314 B1 | | 7/2003 | Wilson |
| 6,643,851 B1 | * | 11/2003 | Janes ................................ 4/236 |
| 7,029,216 B2 | | 4/2006 | McKay |
| 7,056,053 B2 | | 6/2006 | Schilling et al. |
| 7,204,667 B2 | | 4/2007 | Uno et al. |
| 7,252,471 B1 | * | 8/2007 | Manyoky et al. ............. 411/533 |
| 2001/0013143 A1 | * | 8/2001 | Cavagna ........................... 4/240 |
| 2003/0182719 A1 | | 10/2003 | Glesson |
| 2005/0163589 A1 | | 7/2005 | Wilson |
| 2006/0260029 A1 | * | 11/2006 | Kelly ............................... 4/240 |
| 2007/0061952 A1 | * | 3/2007 | Huang ............................. 4/234 |
| 2007/0089222 A1 | | 4/2007 | Leibfried |
| 2007/0177958 A1 | | 8/2007 | Uno et al. |
| 2007/0294813 A1 | * | 12/2007 | Leibfried ......................... 4/240 |
| 2009/0276944 A1 | | 11/2009 | Hand et al. |

FOREIGN PATENT DOCUMENTS

| | | |
|---|---|---|
| DE | 202004010520 | 9/2004 |
| EP | 320569 | 6/1989 |
| EP | 0320569 | 6/1989 |
| EP | 0345835 | 12/1989 |
| FR | 2560651 | 9/1985 |
| GB | 2153948 | 8/1985 |
| GB | 2167096 | 5/1986 |

OTHER PUBLICATIONS

PCT/US2009/033907 International Search Report.
Office Action from the United States Patent and Trademark Office for U.S. Appl. No. 12/503,527 dated Jan. 3, 2012 (8 pages).
Office Action from the State Intellectual Property Office of the People's Republic of China for Application No. 200910007587.8 dated Nov. 22, 2011 (7 pages).

* cited by examiner

US 8,281,420 B2

HINGE ASSEMBLY FOR A TOILET SEAT

CROSS-REFERENCE TO RELATED APPLICATIONS

This application claims priority under 35 U.S.C. §119 to Provisional Patent Application No. 61/066,681 filed Feb. 22, 2008, and to Provisional Patent Application No. 61/109,049 filed Oct. 28, 2008, the contents of both of which are herein incorporated by reference.

BACKGROUND

The present invention relates to a hinge assembly for pivotally coupling a toilet seat to a toilet bowl. More specifically, the invention relates to a hinge assembly that maintains clamping force between the toilet seat and toilet bowl in the course of repetitive use of the toilet seat.

SUMMARY OF THE INVENTION

In one aspect, the invention provides a hinge assembly for a toilet seat. The hinge assembly includes a hinge post for pivotally supporting the toilet seat on a toilet bowl, and a bolt embedded in the hinge post and configured to extend through an opening in the toilet bowl. The bolt has thereon one or more projections extending into the hinge post to distribute to the hinge post forces applied to the bolt.

In another aspect, the invention provides a hinge assembly for a toilet seat. The hinge assembly includes a hinge post for pivotally supporting the toilet seat on a toilet bowl, and a bolt connectable to the hinge post for securing the hinge post to the toilet bowl. The bolt is configured to extend through an opening in the toilet bowl. The hinge assembly further includes a nut threadable onto the bolt to secure the hinge post to the toilet bowl, the nut having a first segment threadable onto the bolt, a second segment and a shear segment connecting the first and second segments. The shear segment has a lower torque resistance than the first and second segments such that the shear segment breaks when torque applied to the second segment reaches a predetermined amount.

In another aspect, the invention provides a hinge assembly for a toilet seat. The hinge assembly includes a hinge post for pivotally supporting the toilet seat on a toilet bowl, the hinge post including a bushing configured to extend into and conform to the shape of an opening in the toilet bowl. The hinge assembly further includes a bolt embedded in the hinge post, the bolt extending through the bushing and being configured to extend through the opening in the toilet bowl, and a nut threadable onto the bolt to secure the hinge post to the toilet bowl.

In another aspect, the invention provides a pre-assembled nut for a hinge assembly for a toilet seat, the hinge assembly including a hinge post for pivotally supporting the toilet seat on a toilet bowl, and a bolt connectable to the hinge post for securing the hinge post to the toilet bowl, the bolt being configured to extend through an opening in the toilet bowl, the nut being threadable onto the bolt to secure the hinge post to the toilet bowl, and the nut comprising: a first segment threadable onto the bolt, the first segment including internal threads for threading the nut onto the bolt; a second segment having an inner wall such that the second segment does not thread onto the bolt; a shear segment connecting the first and second segments, the shear segment having a lower torque resistance than the first and second segments such that the shear segment breaks when torque applied to the second segment reaches a predetermined amount; a neck segment extending from the first segment, the neck segment having therethrough an opening configured to receive the bolt; and a washer surrounding the neck segment while being free to rotate relative to the neck segment, the washer being mounted on the neck segment such that a force other than gravity must be applied to remove the washer from the neck segment, the washer being configured to engage the toilet bowl.

In another aspect, the invention provides a method of packaging and installing a hinge assembly for a toilet seat, the method comprising: providing a hinge assembly including a hinge post for pivotally supporting the toilet seat on a toilet bowl, a bolt for securing the hinge post to the toilet bowl, and a pre-assembled nut including a first segment threadable onto the bolt, the first segment having therethrough an opening configured to receive the bolt, a neck segment extending from the first segment, the neck segment having therethrough an opening configured to receive the bolt, and a washers surrounding the neck segment while being free to rotate relative to the neck segment, the washer being mounted on the neck segment such that a force other than gravity must be applied to remove the washer from the neck segment, the washer being configured to engage the toilet bowl; thereafter placing the hinge assembly including the pre-assembled nut in packaging; thereafter removing the hinge assembly including the pre-assembled nut from the packaging; and thereafter installing the hinge assembly on the toilet bowl by extending the bolt through an opening in the toilet bowl to connect the hinge post to the toilet bowl, and thereafter threading the nut onto the bolt to secure the hinge post to the toilet bowl, the nut being threaded onto the bolt so that the washer engages the toilet bowl.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
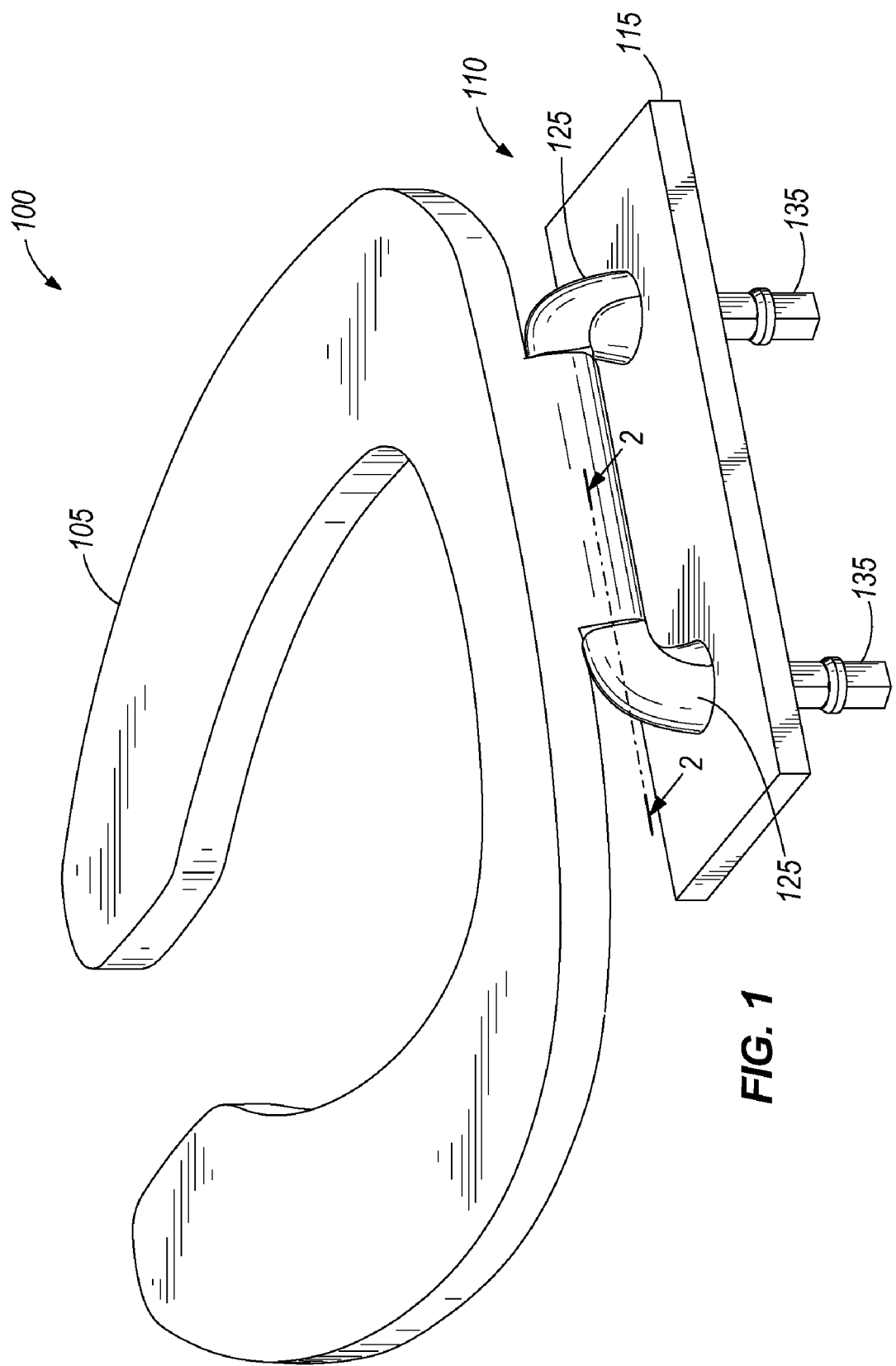
FIG. 1 is a perspective view of a toilet seat including a hinge assembly embodying the invention.
Figure 2:
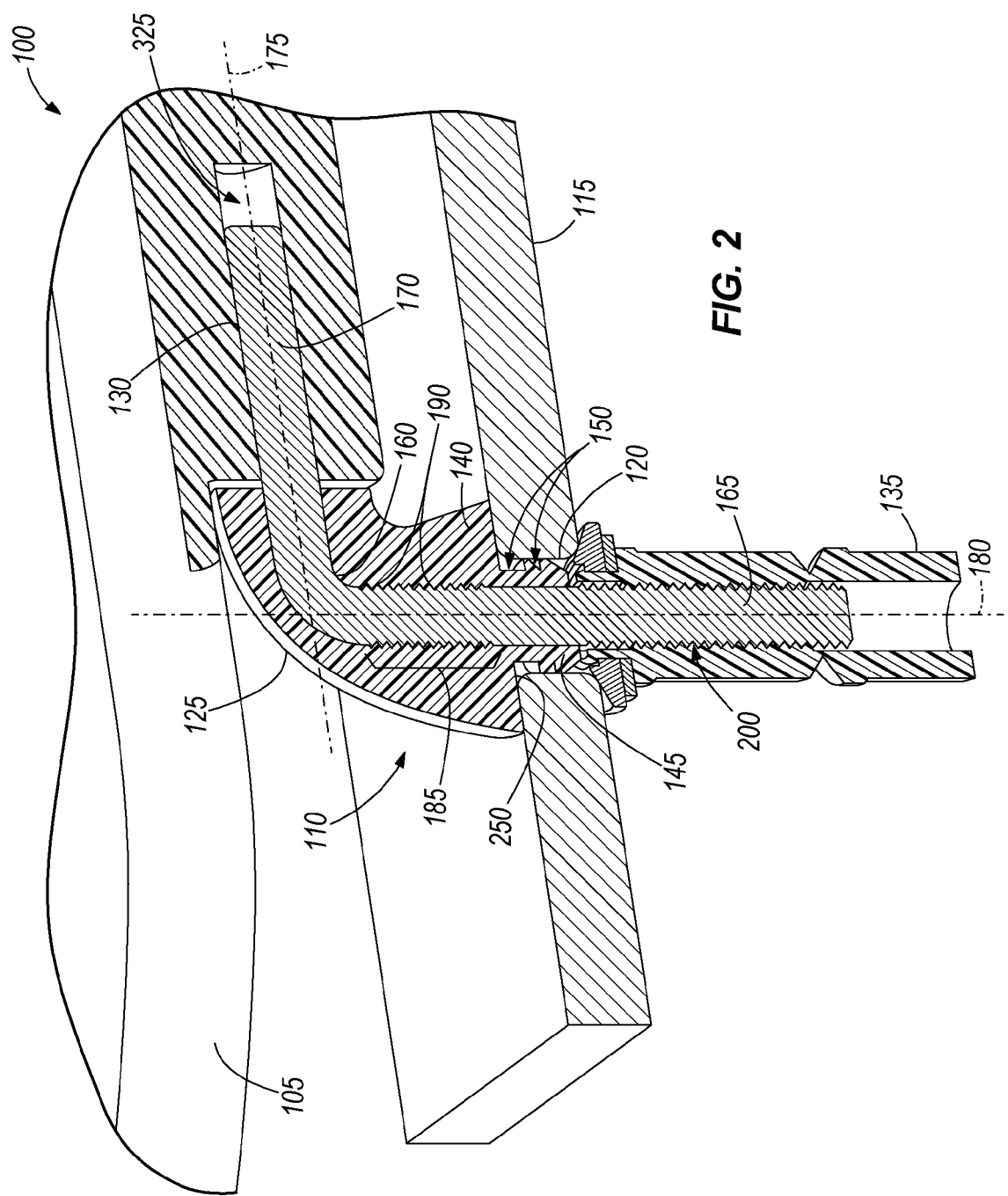
FIG. 2 is a cross-section view of the hinge assembly taken along line 2-2 shown in FIG. 1.
Figure 3:
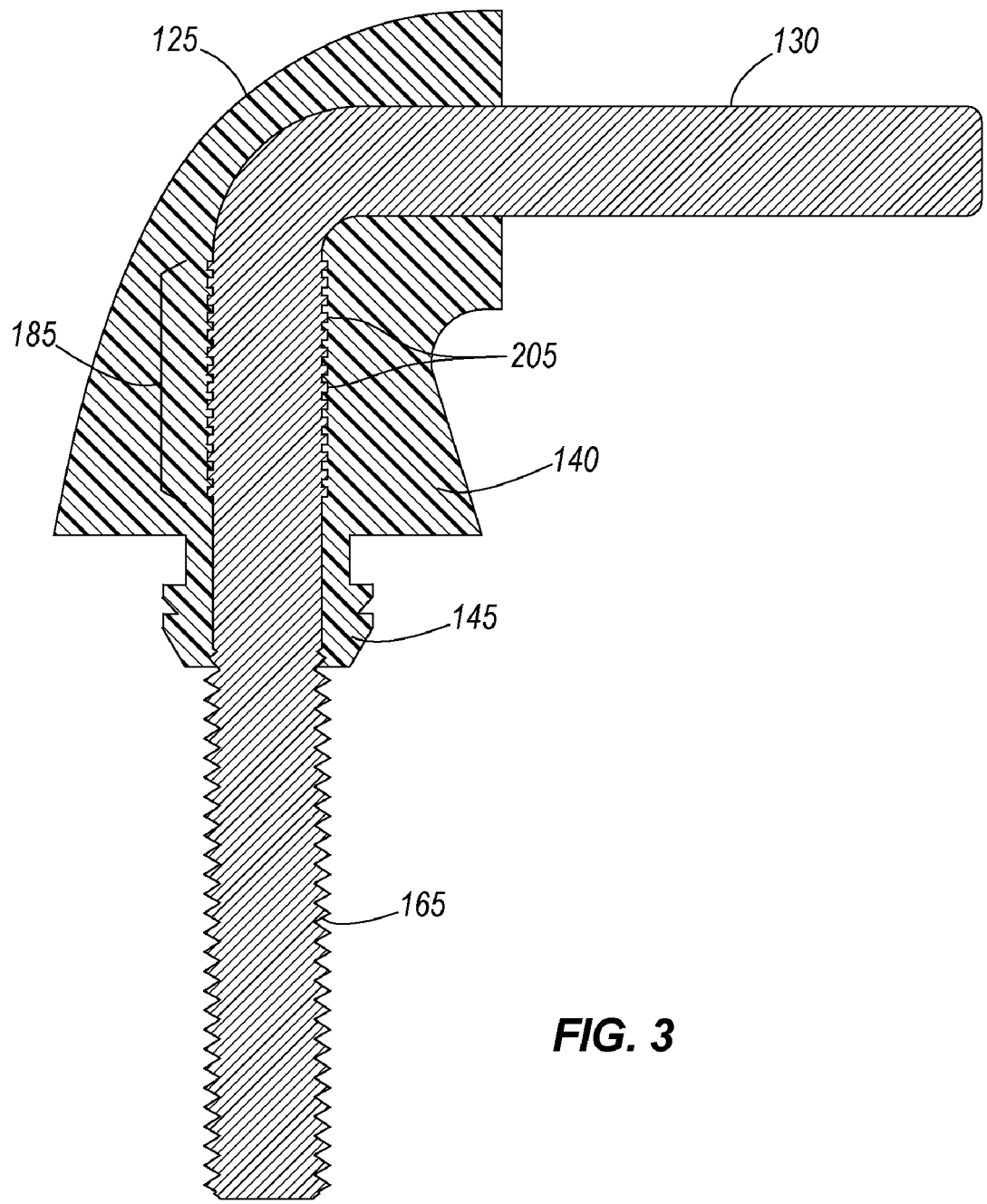
FIG. 3 is a cross-section view of a mounting bolt of the hinge assembly according to another embodiment of the invention.
Figure 4:
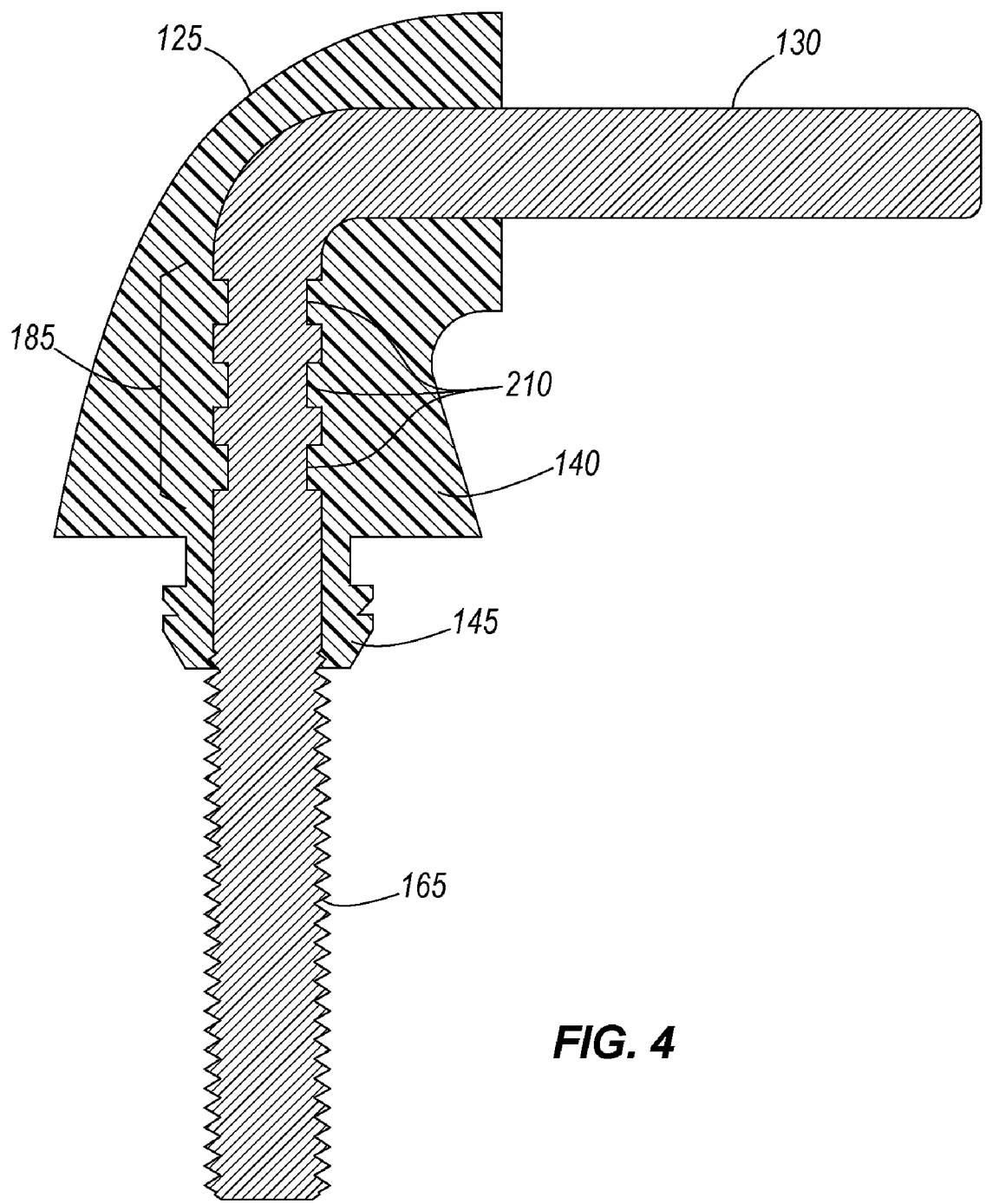
FIG. 4 is a cross-section view of a mounting bolt of the hinge assembly according to another embodiment of the invention.
Figure 5:
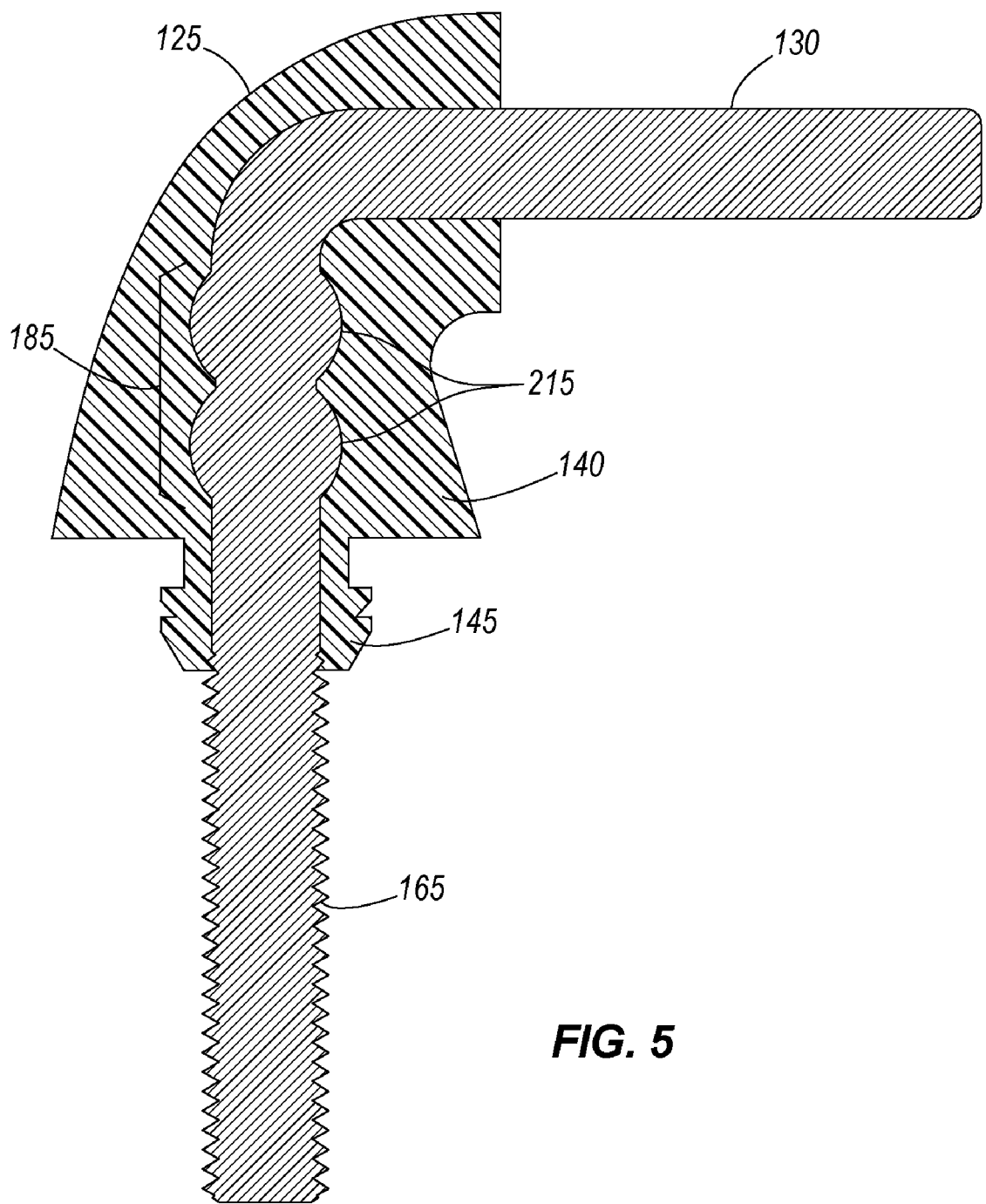
FIG. 5 is a cross-section view of a mounting bolt of the hinge assembly according to another embodiment of the invention.
Figure 6:
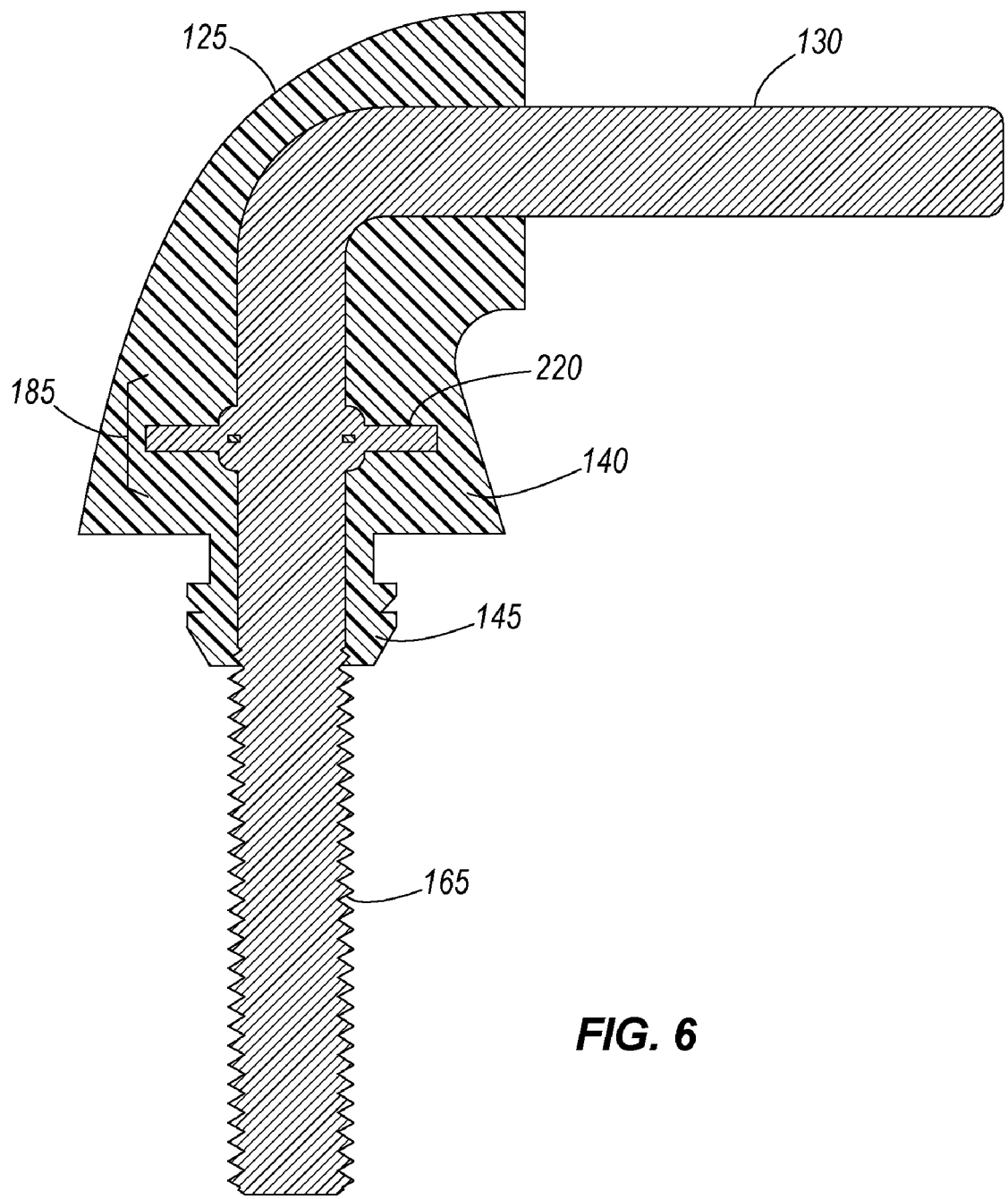
FIG. 6 is a cross-section view of a mounting bolt of the hinge assembly according to another embodiment of the invention.

FIGS. 1 and 2 show a toilet seat assembly 100 embodying the invention. The toilet seat assembly 100 includes a toilet seat or ring 105 as is known in the art. The toilet seat assembly 100 also includes a hinge assembly 110 for pivotally coupling the toilet seat 105 to a portion of a toilet bowl 115.

The toilet bowl portion 115 includes a pair of mounting holes or apertures 120 (a single mounting hole 120 is shown in FIG. 2). The mounting holes 120 typically have a circular shape. The diameter of each mounting hole 120 may range from approximately under 0.400 inches to approximately over 0.630 inches. In some constructions, the mounting holes 120 may have degrees of non-roundness or may be more oval shaped, by as much as, for example, approximately 0.06 inches.

The hinge assembly 110 includes a pair of hinge posts 125 (FIG. 1) for pivotally supporting the toilet seat on the toilet bowl, a pair of generally L-shaped mounting bolts 130 (a single bolt 130 is shown in FIG. 2), and a pair of nuts 135 (FIG. 1). The mounting bolts 130 have a substantially circular cross-section. As shown in FIG. 2, the mounting bolt 130 has a bend or radius 160 that defines a vertical leg or first leg 165 having an axis 180 and a horizontal leg or second leg 170 having an axis 175 substantially perpendicular to the axis 180. The vertical leg 165 extends through the opening 120 in the toilet bowl 115 and the horizontal leg 170 is coupled to the toilet seat 105. It should be understood that the mounting bolts need not be L-shaped. For example, the vertical leg could be a conventional carriage bolt, and the horizontal leg could be a separate pin.

Referring to FIG. 2, each hinge post 125 includes a body 140 and a bushing 145. The bushing 145 is preferably integral with the body 140, as further discussed below. The body 140 has a lower surface 250 that sits on top of the toilet bowl, the bushing 145 extends into the respective mounting hole 120, and the vertical portion of the bolt 130 extends through the bushing 145 and through the mounting hole 120. The vertical leg 165 of the bolt 130 has threads 200, and the nut 135 is threaded onto the threads 200 of the bolt 130 to secure the hinge post 125 to the toilet bowl. The horizontal leg 170 of the bolt 130 extends into a bore 325 in the toilet seat 105 to pivotally mount the toilet seat, as is known in the art.

Each hinge post 125 is molded, by molding processes known in the art, around the respective mounting bolt 130. As a result, each mounting bolt 130 is embedded in the respective hinge post 125 such that each hinge post 125 surrounds a portion of the vertical and horizontal legs 165, 170. The hinge posts 125 are made of a material that has high shear strength and high modulus plastic, such as glass fiber reinforced propylene or nylons. As shown in FIG. 2, the vertical leg 165 of the mounting bolt 130 includes a first or upper portion 185 having thereon upsets or projections 190 in the form of threads. The threads 190 extend into the hinge post 125 and allow some of the clamping forces on the bolt 130 to be distributed to the portion of the hinge post 125 surrounding the vertical portion of the bolt, rather than having all of the forces applied to the hinge post by the horizontal portion of the bolt. This allows the hinge assembly 110 to achieve high clamping forces and maintain ultimate clamping forces over time. In addition, the threads or upsets 190 resist creeping or coldflows of the material forming the hinge post 125. Other arrangements, some of which are discussed below, can be used to distribute the forces from the bolt to the hinge post.

Figure 8:
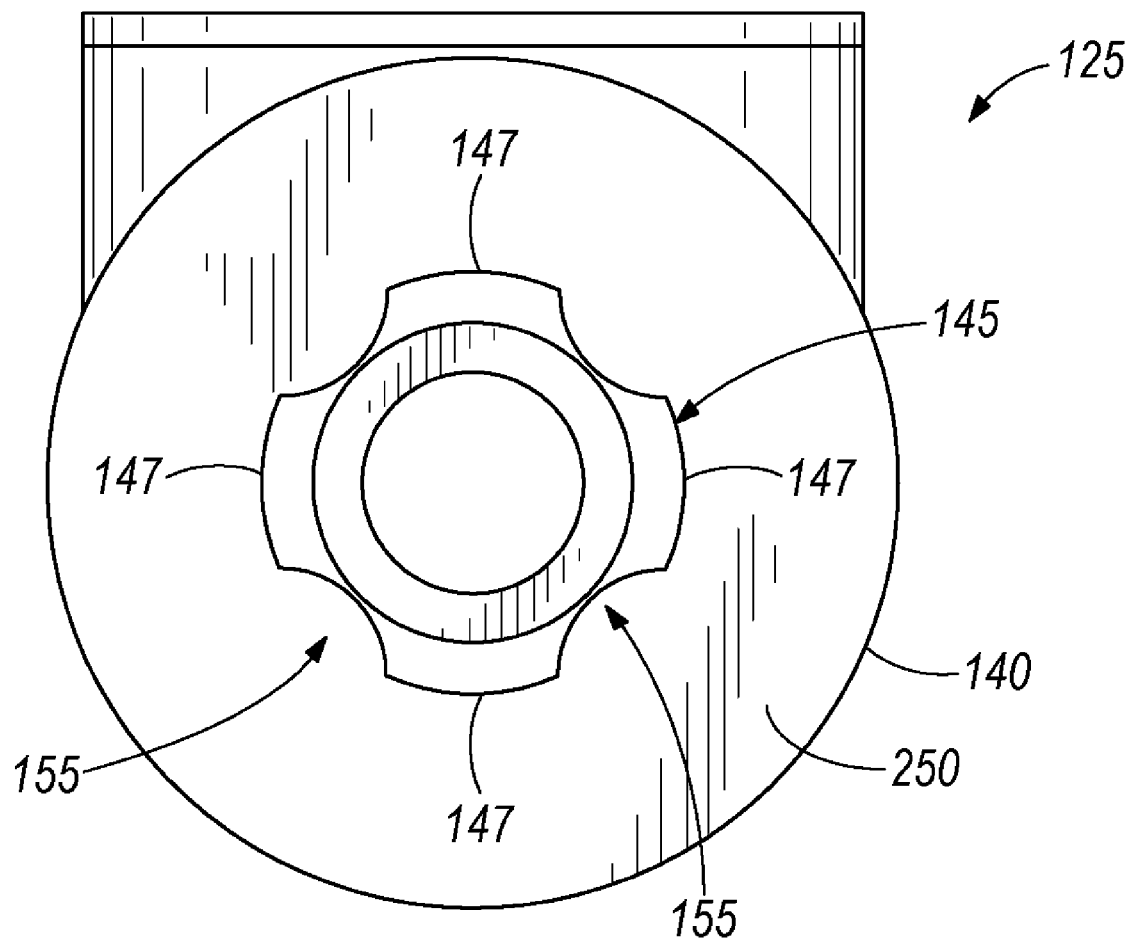
FIG. 8 is a bottom view of a hinge post of the hinge assembly shown in FIG. 1.

FIG. 8 shows a hinge post 125 without the mounting bolt. Each bushing 145 is capable of conforming to the various dimensions and shapes of the mounting holes 120 in the toilet bowl 115. In the illustrated embodiment, each bushing 145 includes a plurality of radial projections 147 that deform and conform to the shape of the mounting hole. More particularly, the bushing has four pairs of projections 147 (only the lower projections 147 of each pair can be seen in FIG. 8). Each pair has two axially spaced projections 147, and the pairs are spaced at ninety degree angles around the bushing 145. Each projection has a substantially horizontal upper surface and has an inclined lower surface that facilitates insertion of the bushing into the mounting hole. The two projections in each pair define circumferential grooves 150 (FIG. 2), and adjacent pairs of projections 147 define therebetween axial grooves 155 (FIG. 8). This construction allows the bushing 145 to conform to the mounting hole 120. Other constructions are within the scope of the invention. The material properties of the bushing 145 should govern the dimensions and geometry of the bushings 145.

As explained above, the body 140 and the bushing 145 are molded as a single piece. In other constructions, the body 140 and bushing 145 may be molded as separate pieces. In yet other constructions, the bushing 145 may be molded of multiple materials in a multi-shot molding process to incorporate a second, lower durometer material to the bushing 145, such that the bushing 145 offers further accommodations to various mounting hole sizes. In some constructions, the bushing 145 may also be molded of material that has various colors for aesthetic advantages.

In other constructions, as shown in FIGS. 3 through 6, various upsets or projections may be stamped or formed on the first portion 185 of the first leg 165 to engage the hinge post 125. For example, some of the various upsets may include a plurality of projections or ribs 205 (FIG. 3), a plurality of grooves 210 (FIG. 4) formed about the circumference of the vertical leg 165 of the mounting bolt 130, a plurality of bulge-like structures 215 (FIG. 5) formed about the circumference of the vertical leg 165 of the mounting bolt 130, or a flat washer 220 (FIG. 6) welded onto the mounting bolt 130. Other upsets or projections having various geometries, not discussed herein, may be stamped or formed on each mounting bolt 130 such that each hinge post 125 is molded over or around each mounting bolt 130 and will support clamping forces. In the above-mentioned alternative construction using a carriage bolt for the vertical leg, the head of the carriage bolt provides the projections.

Figure 7:
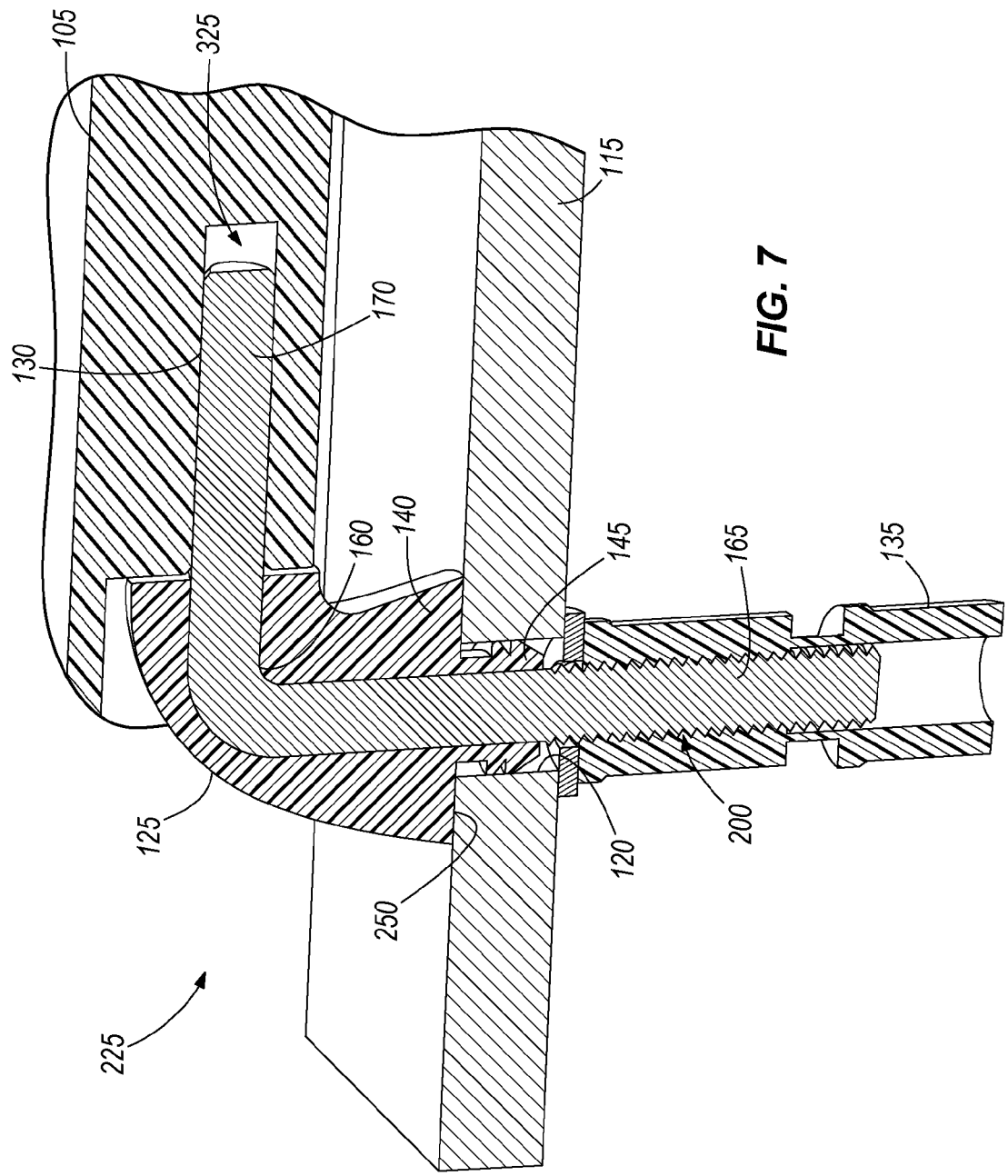
FIG. 7 is a cross-section view of a hinge assembly according to another embodiment of the invention.

FIG. 7 illustrates a hinge assembly 225 according to another embodiment of the invention. The hinge assembly 225 is substantially identical to the hinge assembly 110, except that the bolts 130 do not have any threads or other projections inside the hinge posts 125.

Figure 9:
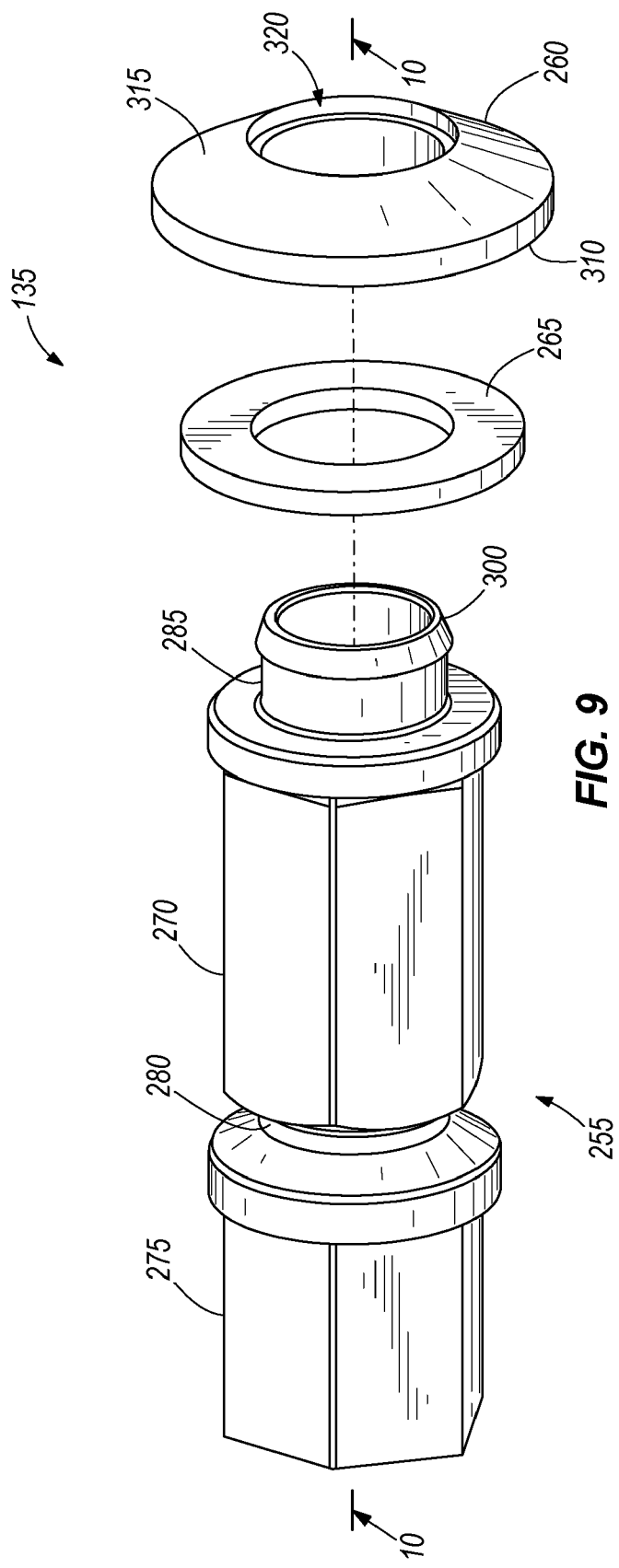
FIG. 9 is an exploded perspective view of a nut of the hinge assembly shown in FIG. 1.
Figure 10:
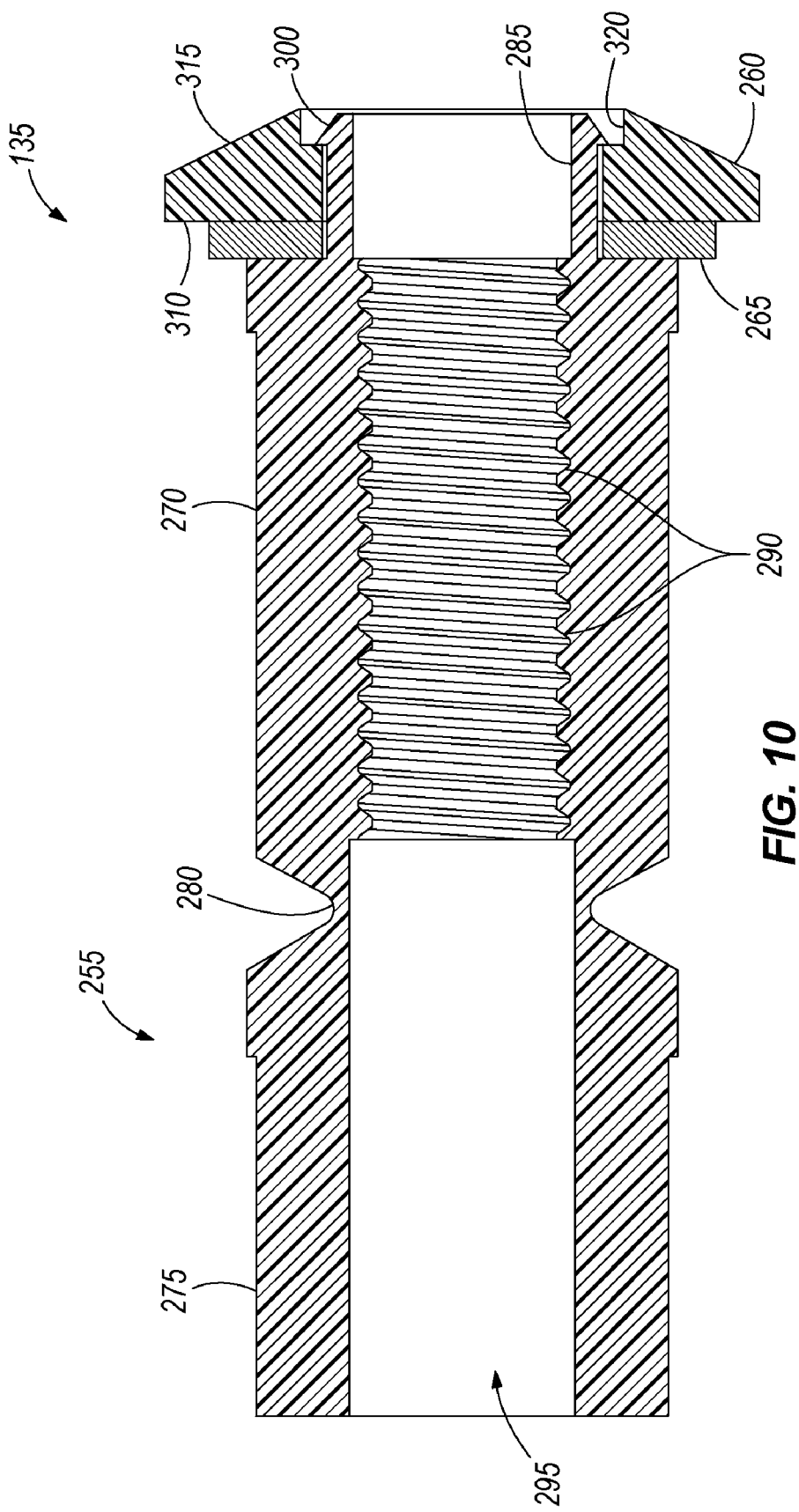
FIG. 10 is a cross-section view of the nut taken along line 10-10 shown in FIG. 9.

Returning to FIG. 2, the nut 135 is a shear nut, meaning a portion of it breaks when the desired torque is reached. This is further explained below. As shown in FIGS. 9 and 10, the nut 135 includes a nut body 255, a first washer 260, and a second washer 265 positioned between the nut body 255 and the first washer 260 when assembled. The nut body 255 includes a first or upper segment 270, a second or lower segment 275, a shear segment 280 (FIG. 10) connecting the segments 270, 275, and a neck or boss segment 285 that is coupled to and extends from the first segment 270.

FIGS. 9 and 10 show the body 255 of the nut 135. The upper segment 270 of the nut body 255 is hex-shaped and has internal threads 290 (FIG. 10) to allow the nut 135 to screw onto the vertical leg 165 of the mounting bolt 130. The lower segment 275 of the nut 135 is also hex-shaped and has a clearance hole 295 (FIG. 10) to facilitate installation of the nut 135. The shear segment 280 couples together the segments 270, 275 and may have various cross-sectional shapes, as long as the shear segment 208 breaks at the desired level of torque. Also, the shear segment could be two or more sections connecting the segments 270, 275. In the illustrated construction, the shear segment 280 is a single section that is circular in cross-section. To ensure that the shear segment 280 breaks instead of either of the segments 270 or 275, the shear segment 280 has a lower torque resistance than either of the segments 270 or 275. This means that as an increasing torque is applied to the segment 275 and is transmitted to the segments 280 and 270, the segment 280 will break before either of the segments 270 or 275. The lower torque resistance can be provided in many ways, such as, for example and as shown in the drawings, by giving the shear segment 280 a lesser cross-sectional area than either of the segments 270 or 275. In the illustrated construction, the shear segment 280 has an outer diameter less than the maximum widths of the segments 270 and 275. The shear segment 280 is also constructed such that it breaks at the desired torque, as further explained below.

The nut 135 is threaded onto the bolt by using a wrench or other tool to engage the lower segment 275. The torque applied to the segment 275 is transmitted to the segment 270 via the shear segment 280, and this causes the segment 270 to thread onto the bolt. (The lower segment 275 has the clearance hole 295 rather than internal threads and therefore does not engage the bolt.) When the torque between the upper segment 270 and the bolt reaches the desired level, the further application of force to the lower segment causes the shear segment 280 to break, so that the lower segment 275 separates from the upper segment 270 and can be removed. The nut 135 allows the installer to apply continuous torque to the nut 135 without fear of over-torquing the nut 135 or breaking the toilet bowl 115. If it is later necessary to remove the nut 135 from the bolt, a tool can be used to engage the upper segment 270 to unthread the nut from the bolt.

To resist galling under frictional loads, the nut 135 is formed of a material dissimilar to that of the bolt 130, which is generally made of stainless steel. Galling may limit the clamping force that may be generated for a given torque and/or may cause difficulty in removing the nut 135 when the toilet seat 105 is being replaced. The nut is preferably made of glass fiber reinforced propylene or nylon, although other materials can be used.

Figure 11:
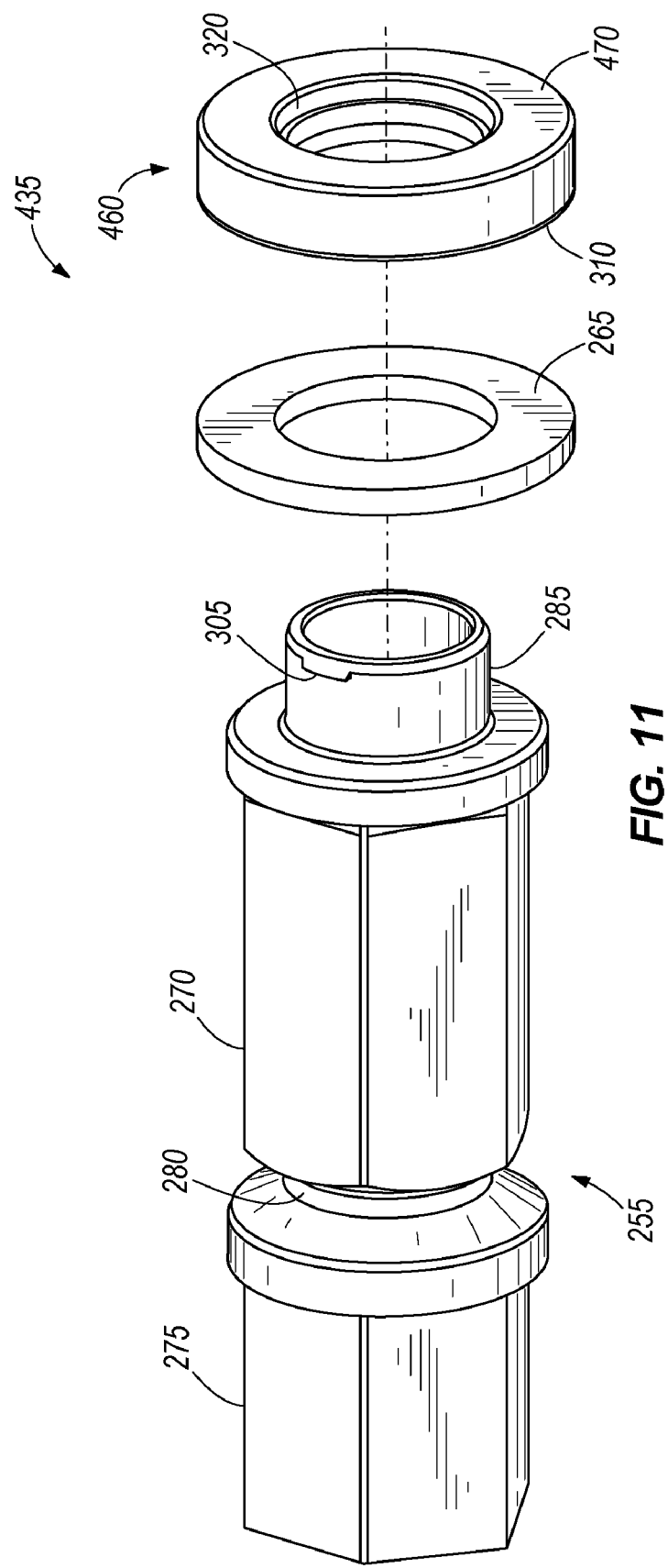
FIG. 11 is an exploded perspective view of an alternative nut of the hinge assembly.
Figure 12:
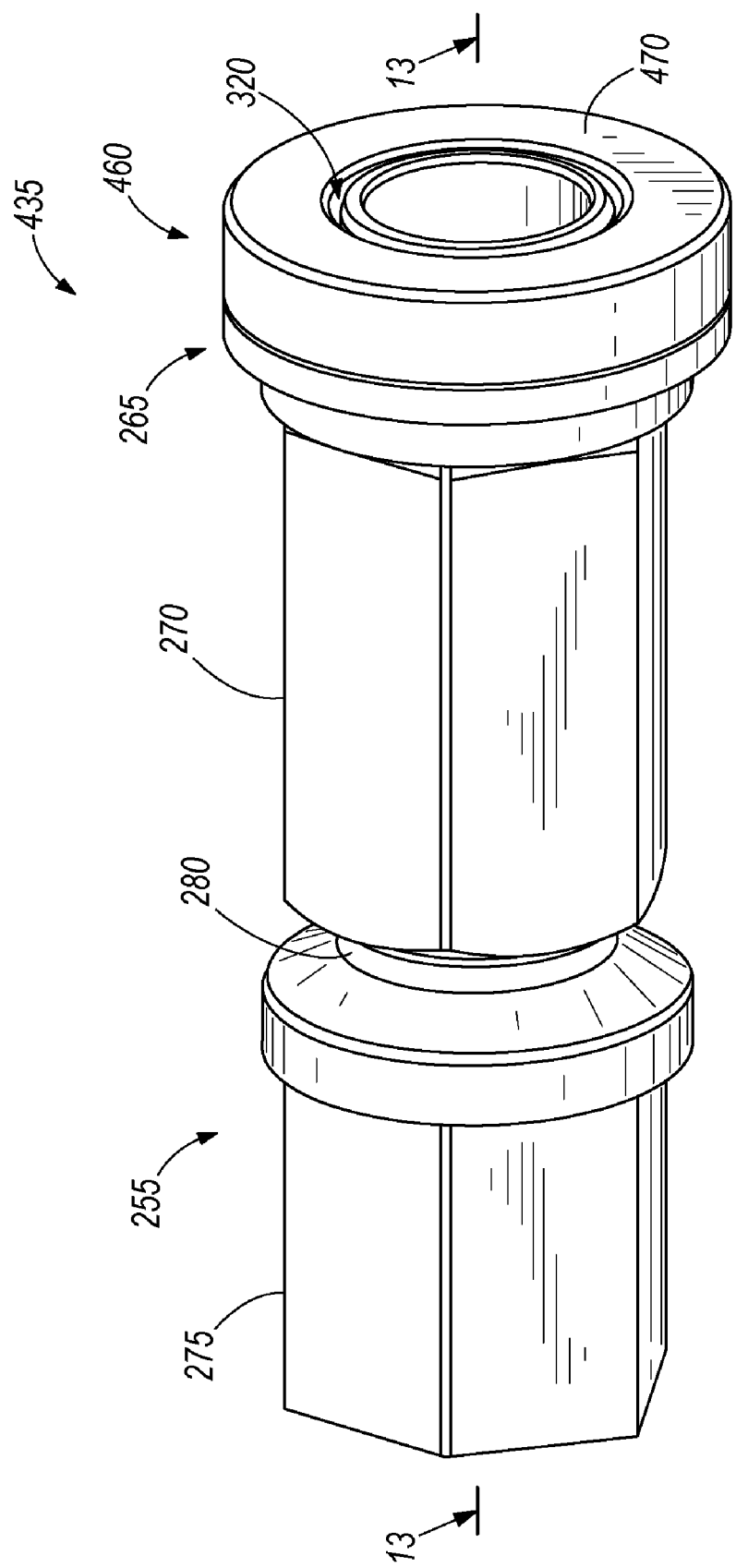
FIG. 12 is an assembled view of the nut shown in FIG. 11.
Figure 13:
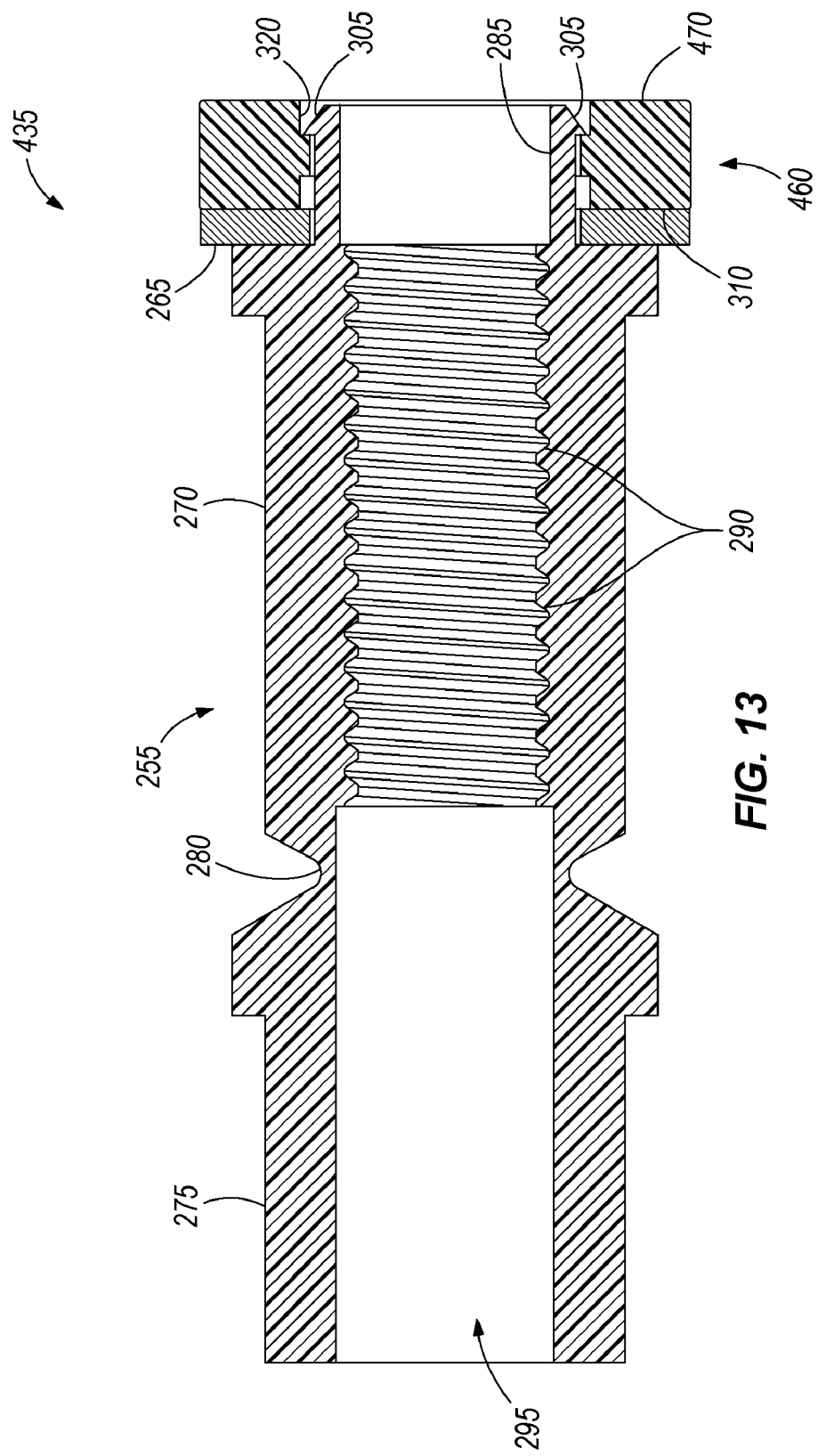
FIG. 13 is a cross-section view of the nut taken along line 13-13 in FIG. 12.

As shown in FIGS. 9 and 10, the neck segment or boss 285 includes a lip 300 around its end. The lip 300 has a frustoconical upper surface and allows the first and second washers 260, 265 to be snap-assembled around the neck segment 285. The lip 300 is illustrated in FIGS. 9 and 10 as a single, continuous projection about the periphery of the neck segment 285; however in an alternative, and currently preferred construction, as shown in FIGS. 11 through 13, the lip 300 can be replaced by two or more projections 305 extending from the periphery of the neck segment 285. The construction shown in FIGS. 11 through 13 has two diametrically-opposed projections 305, each having an arcuate extent of approximately thirty degrees. This method of snap-assembling the washers 260, 265 onto the neck segment 285 means that a force other than gravity is required to remove the washers 260, 265 from the neck segment 285. In other words, the washers will not fall off of the neck segment while being handled by an installer.

Pre-assembling the washers 260, 265 to the nut body 255 provides the advantages of ensuring that the washers 260, 265 are in fact used, ensuring that the washers 260, 265 are positioned correctly on the nut body 255, and easing the assembly for an installer who now only has to deal with one component (the nut 135 fully assembled), instead of two or three loose components (i.e., nut body 255 and washers 260, 265). The hinge assembly is packaged with the nut pre-assembled so that the nut is pre-assembled when it is removed from the packaging by the installer. In other constructions, the nut 135 may be assembled in various processes, such as a staking over process after assembly, melting process, or welding process.

The nut 135 adapts for considerable ranges of diameters and degrees of non-roundness for the mounting holes 120 in the toilet bowl 115. As shown in FIGS. 9 and 10, the washer 260 is a cone-shaped washer that includes a flat surface 310 that contacts the washer 265 when assembled, and a tapered or frustoconical surface 315 opposite that of the flat surface 310 to engage and center the nut into, for example, the irregular, oversized mounting hole 120 in the toilet bowl 115. The washer 260 further includes a channel or counterbore 320 recessed from the tapered surface 315 to receive the lip 300 or projections 305 of the nut body 255. The washer 260 is free to rotate relative to the nut body 255 which reduces the friction torque as the nut 135 engages the toilet bowl 115. The washer 260 may be formed of glass fiber reinforced propylene or nylon such that the material has strength and low friction properties to provide a repeatable, low friction contact between the nut 135 and the toilet bowl 115. The combination of the washers 260, 265 with the nut body 255 resists radial movement of the bolt within the mounting holes which prevents the threads 200 of the mounting bolt 130 from contacting the mounting holes 120 of the toilet bowl 115, and thereby from damaging the toilet bowl 115. FIGS. 9 and 10 show that the second or lower washer 265 is a substantially flat washer and is formed of a material dissimilar to the nut body 255 and first washer 260. The washer 265 may be formed of a metal, such as brass or stainless steel, or may be formed of a plastic that exhibits good bearing characteristics, such as acetal.

In other constructions, the washers 260, 265 may be formed as a single piece in a two-shot molding process. For example, a first material for the washer 260 may be glass fiber filled nylon, and a second material may be acetal for overmolding onto the flat surface 310 of the washer 260, essentially providing the second washer 265, but in a one piece molding.

FIGS. 11 through 13 illustrate an alternative nut 435. Except as described below, the nut 435 is substantially identical to the nut 135, and common elements have the same reference numerals. The nut 435 also has a washer 265. On the nut 435, the cone-shaped washer 260 is replaced by a flat washer 460. The washer 460 has a flat surface 310 that contacts the washer 265 and an opposite flat surface 470 that engages the toilet bowl adjacent the mounting hole 120. The conical surface 315 of the nut 135 may limit the ability to position the seat, as the conical surface 315 works to center the hinge post bolt in the center of the mounting hole 120 in the toilet or china. As the location of the holes in the china have some variability, this can result in the seat not being aligned to the shape of the bowl in some cases. By using the washer 460 with a flat face 470, the hinge post bolt can be positioned off center in the mounting hole 120, thus allowing for some ability to better align the seat to the bowl.

Like the washer 260, the washer 460 is free to rotate relative to the nut body 255, which reduces the friction torque as the nut 435 engages the toilet bowl 115. The washer 460 may be formed of glass fiber reinforced propylene or nylon such that the material has strength and low friction properties to provide a repeatable, low friction contact between the nut 435 and the toilet bowl 115.

Figure 14:
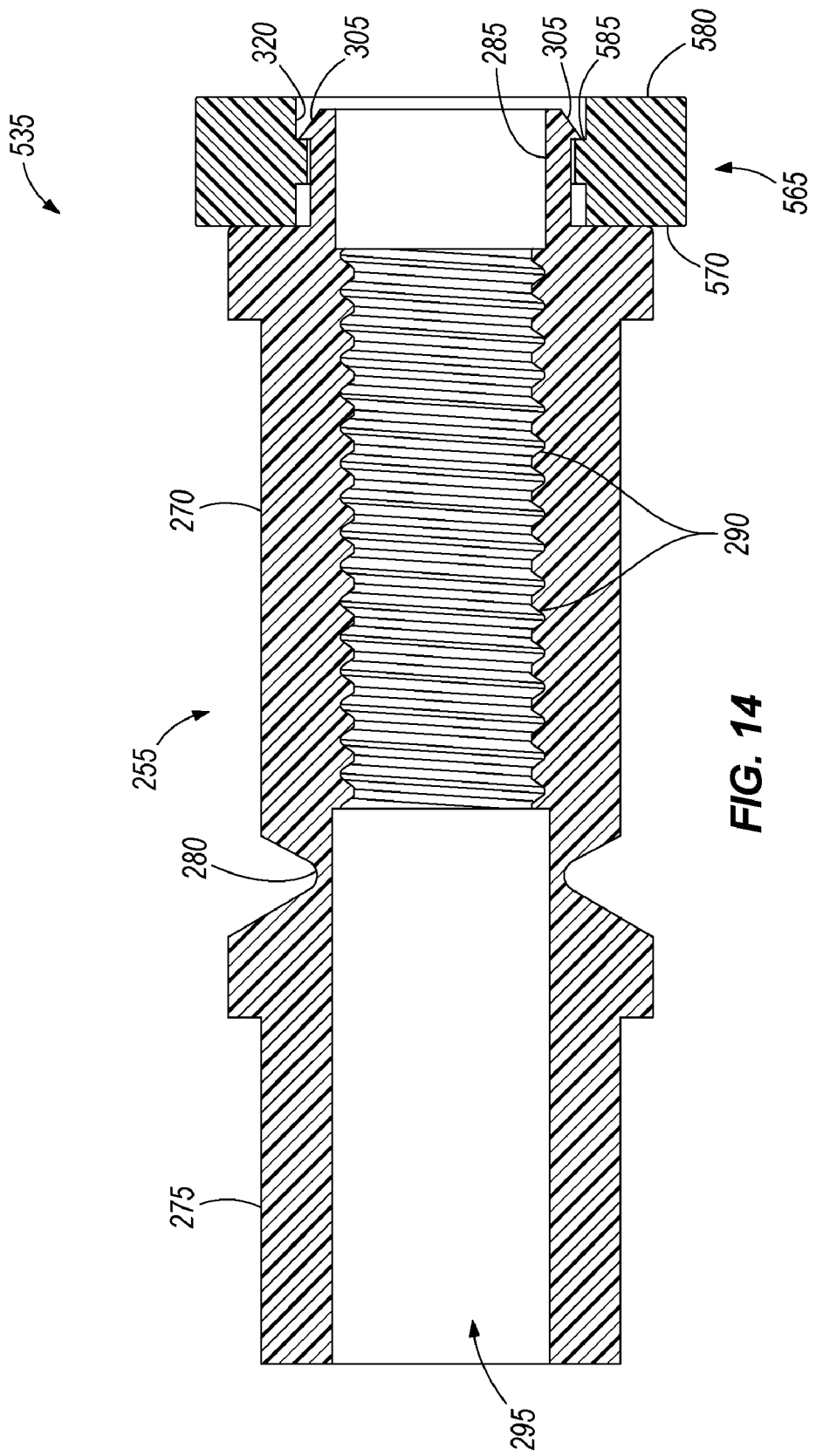
FIG. 14 is a cross-section view of an alternative nut.

FIG. 14 illustrates an alternative nut 535. Except as described below, the nut 535 is substantially identical to the nut 135, and common elements have the same reference numerals. Rather than two washers, the nut 535 has a single flat washer 565 on the neck segment 285. The washer 565 has a flat surface 570 that contacts the nut body 255 and an opposite flat surface 580 that engages the toilet bowl adjacent the mounting hole 120. The neck segment 285 of the nut 535 includes a pair of projections 305 on its end. Each projection 305 has a frustoconical upper surface that allows the washer 565 to be snap-assembled around the neck segment 285. Each projection 305 also has a flat lower surface that engages a shoulder 585, which is formed by the counterbore 320, to hold the washer 565 on the neck segment. The washer 565 is preferably made of plastic, such as injection-molded glass-filled nylon with an added lubricant, as is known in the art. This construction with a single washer 565 may result in lower frictional torque and a higher clamp force than the construction with two washers.

Figure 15:
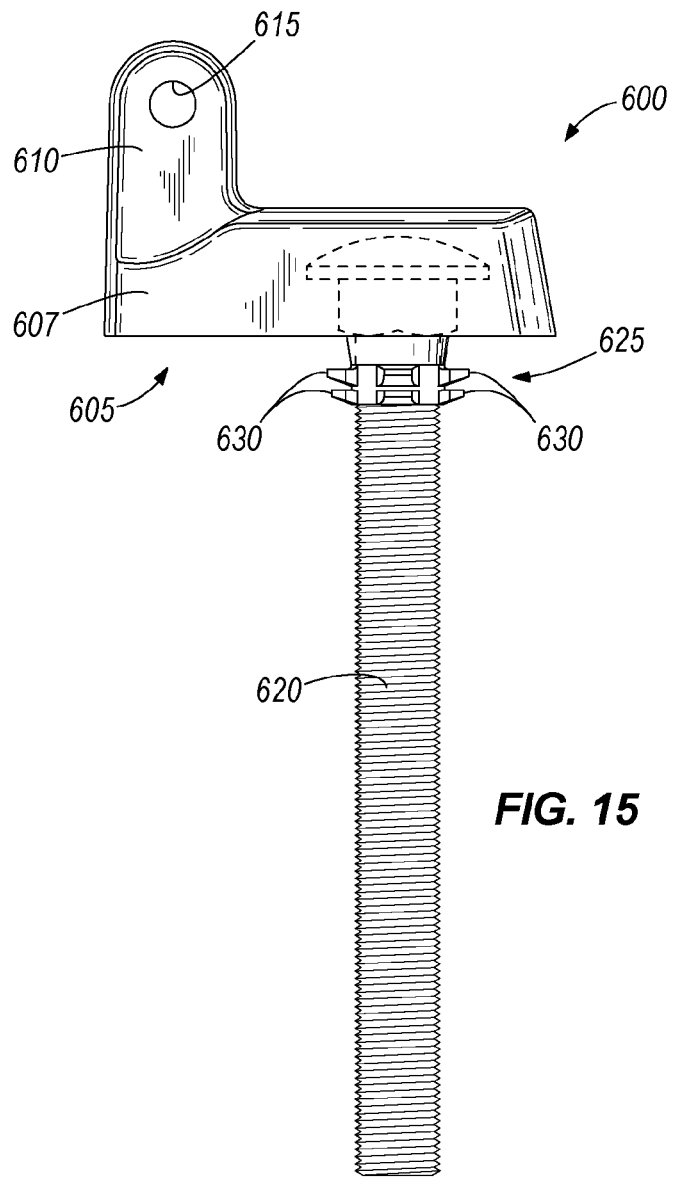
FIG. 15 is a side elevational view of an alternative hinge.
Figure 16:
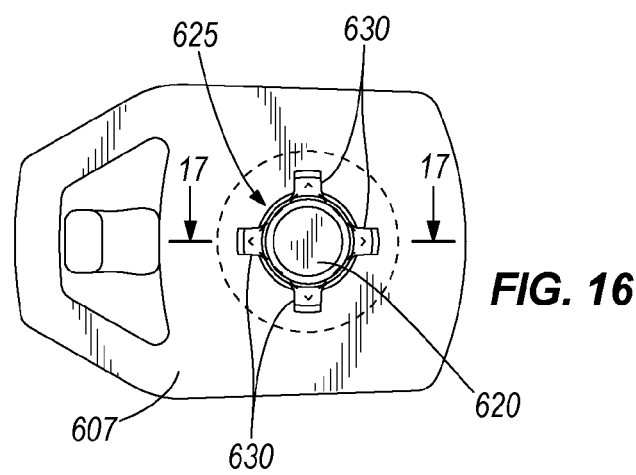
FIG. 16 is a bottom view of the hinge shown in FIG. 15.
Figure 17:
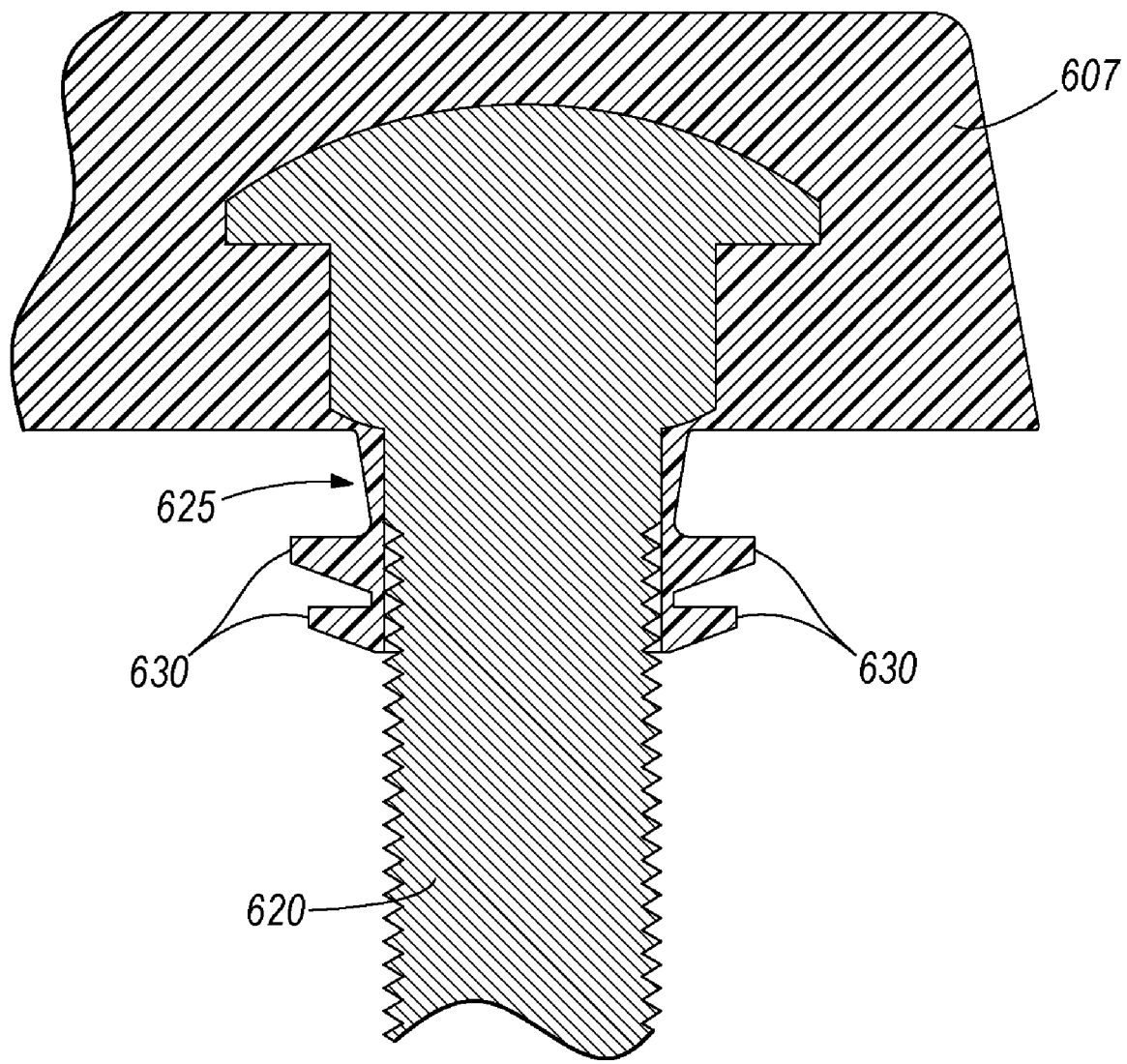
FIG. 17 is an enlarged, partial cross-sectional view taken along line 17-17 in FIG. 16.

FIGS. 15 through 17 illustrate an alternative hinge 600. The hinge 600 comprises a hinge post 605 having a main body 607 that sits on the toilet bowl, and a projection 610 extending upward from the main body 607. The projection 610 has therein a bore 615 that receives a pin (not shown) connected to the toilet seat such that the toilet seat is pivotable relative to the hinge post 605. The hinge post 605 is preferably injection molded, like the hinge post 125, and is molded around the head of a carriage bolt 620. As discussed above, the head of the bolt 620 projects into the hinge post 605 to distribute forces to the hinge post 605 and to prevent the bolt 620 from slipping out of the plastic of the hinge post. The hinge 600 also comprises a bushing 625 that is preferably molded as a single piece along with the hinge post 605, although the bushing 625 could be a separate piece. The bushing 625 is much like the bushing 145. The bushing 625 surrounds the bolt 620 and has four sets of two deformable projections 630 that conform to the shape of the mounting hole 120.

What is claimed is:

1. A hinge assembly for a toilet seat, the hinge assembly comprising:
    a hinge post for pivotally supporting the toilet seat on a toilet bowl;
    a bolt connectable to the hinge post for securing the hinge post to the toilet bowl, the bolt being configured to extend through an opening in the toilet bowl;
    a nut threadable onto the bolt about an axis to secure the hinge post to the toilet bowl, the nut having a first segment threadable onto the bolt, a second segment coaxial along the axis with the first segment, and a shear segment coaxial along the axis with and connecting the first and second segments, the shear segment having a lower torque resistance than the first and second segments such that the shear segment breaks when the nut is rotated relative to the hinge post and torque applied to the second segment reaches a predetermined amount; and
    a washer configured to surround the bolt between the nut and the toilet bowl, the washer being made of a low friction material;
    wherein the first segment, the second segment, and the shear segment of the nut are formed as a single piece;
    wherein the first segment includes an outer surface having a similar shape and size as an outer surface of the second segment such that both the first and second segments are configured to be engaged by a tool;
    wherein the nut further includes a ledge extending outwardly from the second segment, the ledge positioned between the shear segment and the outer surface of the second segment; and
    wherein the nut includes a neck segment extending from the first segment in the direction opposite the second segment, the neck segment including a projection allowing the washer to be snap-assembled around the neck segment.

2. The hinge assembly of claim 1, wherein the first segment includes internal threads for threading the nut onto the bolt, and wherein the second segment has an inner wall such that the second segment does not thread onto the bolt.

3. The hinge assembly of claim 1, wherein the washer is a first washer, and further comprising a second washer configured to surround the bolt between the nut and the toilet bowl, with the first washer engaging the toilet bowl and the second washer between the nut and the first washer, the second washer being made of a material dissimilar to that of the nut.

4. The hinge assembly of claim 3, wherein the first washer is either flat or frustoconical and the second washer is flat.

5. The hinge assembly of claim 1, wherein the neck segment includes at least two projections allowing the washer to be snap-assembled around the neck segment.

6. The hinge assembly of claim 1, wherein the washer includes a recessed area configured to receive the projection.

7. The hinge assembly of claim 1, wherein the first and second segments are hexagonal in cross-section, and wherein the shear segment has a lesser cross-sectional area than the first and second segments.

8. The hinge assembly of claim 1, wherein the hinge post is molded around the bolt to prevent the bolt from slipping out of the hinge post.

9. The hinge assembly of claim 8, wherein the hinge post includes a bushing configured to extend into and conform to the shape of the opening in the toilet bowl, and wherein the bolt extends through the bushing.

10. The hinge assembly of claim 1, wherein the nut is made of plastic.

11. A hinge assembly for a toilet seat, the hinge assembly comprising:
    a hinge post for pivotally supporting the toilet seat on a toilet bowl, the hinge post including a bushing configured to extend into an opening in the toilet bowl, the bushing being formed as a single piece with the hinge post and including a plurality of projections extending radially outward therefrom, the plurality of projections configured to deform as the bushing is inserted into the opening to conform to the shape of the opening;
    a bolt embedded in the hinge post to inhibit rotation of the bolt relative to the hinge post, the bolt configured to extend through the opening in the toilet bowl, the bolt having a head extending into the hinge post to distribute to the hinge post forces applied to the bolt, wherein the hinge post is molded around the head of the bolt to prevent the bolt from slipping out of the hinge post;

a nut threadable onto the bolt about an axis to secure the hinge post to the toilet bowl, the nut having a first segment threadable onto the bolt, a second segment coaxial along the axis with the first segment, a shear segment coaxial along the axis with and connecting the first and second segments, and a ledge extending outwardly from the second segment, the first segment including an outer surface having a similar shape and size as an outer surface of the second segment such that both the first and second segments are configured to be engaged by a tool, the shear segment having a lower torque resistance than the first and second segments such that the shear segment breaks when the nut is rotated relative to the hinge post and torque applied to the second segment reaches a predetermined amount, the ledge being positioned between the shear segment and the outer surface of the second segment; and a washer configured to surround the bolt between the nut and the toilet bowl, the washer being made of a low friction material;

wherein the first segment, the second segment, and the shear segment of the nut are formed as a single piece; and wherein the nut includes a neck segment extending from the first segment in the direction opposite the second segment, the neck segment including a projection allowing the washer to be snap-assembled around the neck segment.

* * * * *